United States Patent [19]
Michel

[11] 3,966,549
[45] June 29, 1976

[54] PRESSURIZED-WATER COOLANT REACTOR INSTALLATION

[75] Inventor: Eberhard Michel, Nurnberg, Germany

[73] Assignee: Siemens Aktiengesellschaft, Munich, Germany

[22] Filed: Dec. 4, 1973

[21] Appl. No.: 421,681

[30] Foreign Application Priority Data
Dec. 15, 1972 Germany............................ 2261477

[52] U.S. Cl................................. 176/65; 165/106; 176/60
[51] Int. Cl.².......................................... G21C 15/12
[58] Field of Search ................ 176/65, 60; 138/111, 138/115, 116, 117; 165/106, 107, 108

[56] References Cited
UNITED STATES PATENTS

| | | | |
|---|---|---|---|
| 435,193 | 8/1890 | Steele | 138/115 |
| 3,110,754 | 11/1963 | Witort et al. | 138/115 X |
| 3,356,583 | 12/1967 | Deighton | 176/65 X |
| 3,357,892 | 12/1967 | Schmidt | 176/40 X |
| 3,397,114 | 8/1968 | Deighton | 176/65 X |

FOREIGN PATENTS OR APPLICATIONS

| | | | |
|---|---|---|---|
| 809,796 | 3/1959 | United Kingdom | 176/65 |

Primary Examiner—Samuel W. Engle
Assistant Examiner—Harold Tudor
Attorney, Agent, or Firm—Kenyon & Kenyon Reilly Carr & Chapin

[57] ABSTRACT

A pressurized-water coolant reactor installation includes a reactor pressure vessel, a steam generator containing a heat exchanger through which coolant from the vessel is circulated, and a single pipe interconnecting the vessel and generator and internally divided into two conduits for conducting the coolant to the steam generator and from the latter back to the vessel. This single pipe is divided into these two conduits by a partition wall extending longitudinally for the length of the pipe inside of the pipe and having side edges joined with the inside of the pipe, and preferably has a transverse curvature making it laterally deformable when the pipe thermally changes in diameter. Other features are involved.

2 Claims, 2 Drawing Figures

PRESSURIZED-WATER COOLANT REACTOR INSTALLATION

BACKGROUND OF THE INVENTION

A pressurized-water coolant reactor installation ordinarily includes the reactor pressure vessel, a steam generator containing a heat exchanger through which the coolant from the vessel is circulated, and a coolant pump which draws or sucks the coolant from the heat exchanger's outlet and discharges it to the pressure vessel via a pipe line which forms a loop with one leg going from the vessel to the steam generator and the other leg, via the coolant pump, returning to the vessel.

The steam generator has a vertical housing with its lower portion closed by a tube sheet in which the inlet and outlet legs of an inverted U-shaped tube bundle heat exchanger are mounted, the housing below this tube sheet being partitioned to form inlet and outlet manifolds for the inlet and outlet ends of the heat exchanger. Ordinarily a pipe from the vessel connects with the inlet manifold and a separate pipe connects the outlet manifold with the pressure vessel via the coolant pump.

To improve on the above, it has been proposed in U.S. Application No. 393,287 filed Aug. 31, 1973 that the coolant pump be built into the housing below the steam generator's tube sheet with the construction providing concentric inlet and outlet coolant connections connected to the pressure vessel by concentric inner and outer pipes. This has the disadvantage that the construction of such a dual pipe line is expensive and complicated, it being necessary to provide supports between the inner and outer tubes to hold them in their concentric position. The supports must be interposed as obstructions to the coolant flow.

The object of the present invention is to provide a construction providing a simpler and less expensive way for dividing the two flows within one pipe.

SUMMARY OF THE INVENTION

According to the present invention, the two lines are formed by a pipe internally divided into the two conduits by a transverse partition wall extending longitudinally for the length of the pipe inside of the pipe and having side edges joined as by welding, with the inside of the pipe. This partition may be flat and free from curvature but preferably it has a transverse curvature making it laterally deformable by bowing when the pipe thermally changes in diameter or from cold to hot condition. If flat, the partition accommodates the pipe diameter changes by itself thermally expanding and contracting with any difference taken up by the elasticity of its metal.

The pipe is cylindrical and the preferred partition wall curvature is one approximately one-half the curvature of the pipe wall. Preferably the connections between the vessel and steam generator are made so that the hotter coolant going from the vessel to the steam generator travels through the conduit formed on the convex side of the partition wall, the cooler coolant returning from the generator on the concave side of the partition wall. There is a pressure differential between the two coolant flows and this places the higher pressure on the convex side of the partition wall causing it to operate in compression instead of tension.

The partition wall, for reasons of corrosion and strength, may be made of a metal different from that of the pipe. Its exact transverse curvature may vary somewhat from that previously described. However, with greater curvature the cross sections of the two conduits become undesirably different, curvatures smaller than about one quarter of the curvature of the pipe making the partition wall too rigid to enjoy the benefit of the bowing action. The coolant temperature may range from a reactor shutdown temperature of about 20°C up to reactor operating temperatures of 350°C, and the integrity of the partition wall must be maintained throughout the consequent range of pipe diameter changes due to its thermal expansion and contraction.

BRIEF DESCRIPTION OF THE DRAWING

A specific example of a pressurized-water coolant nuclear reactor installation incorporating the invention is schematically illustrated by the accompanying drawing, in which.

DETAILED DESCRIPTION OF THE INVENTION

Figures 1, 2:
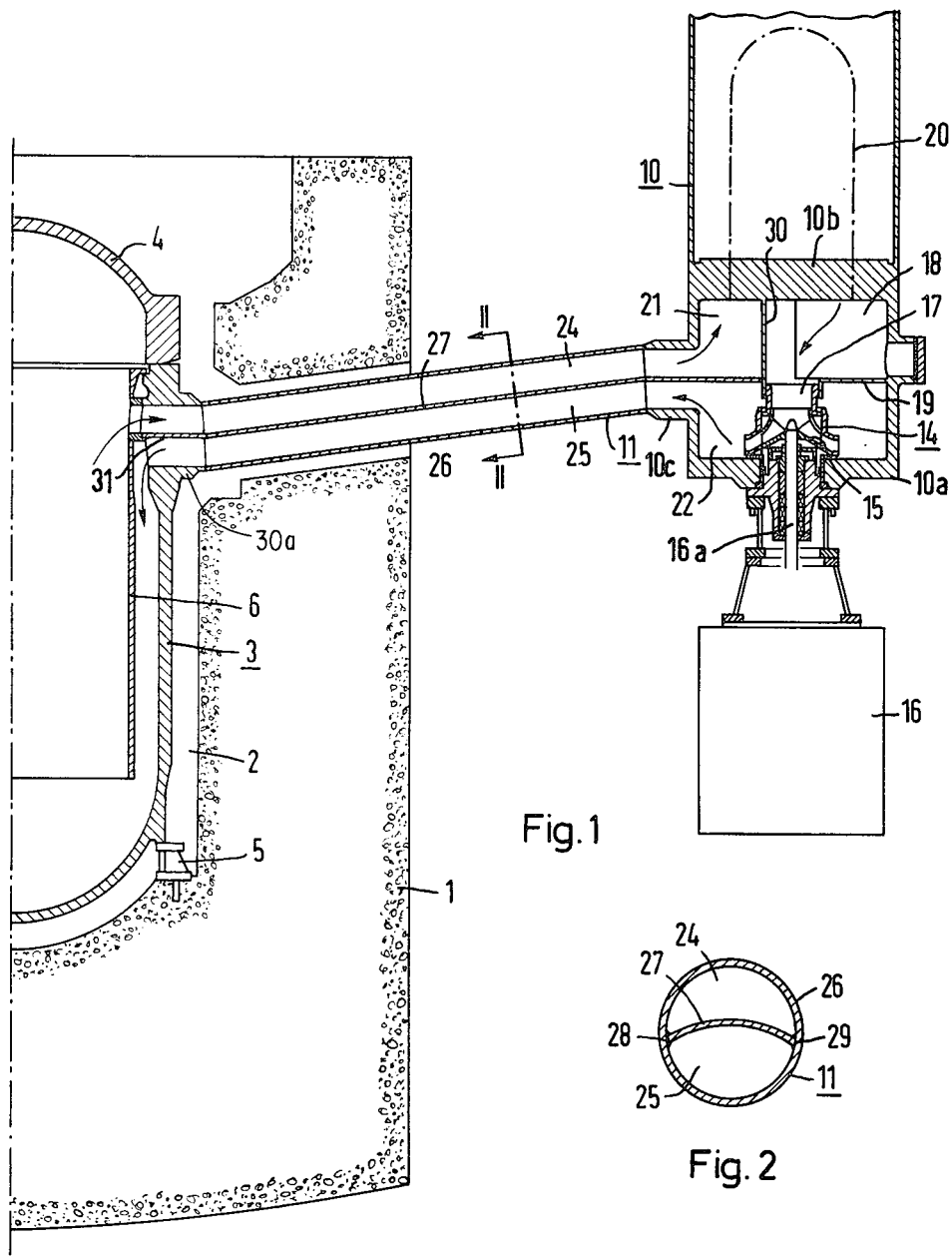
FIG. 1 is a vertical section.
FIG. 2 is a cross section taken on the line 2—2 in FIG. 1.

The above drawings show concrete 1 forming a reactor pit 2 in which the steel pressure vessel 3 is supported on an annular support 5 by the bottom of the pit. The reactor core is not shown but the drawings do show the core vessel 6 in which the fuel elements are mounted. The vessel 6 forms a space between it and the inside of the vessel 3, coolant descending in this space and rising inside of the core vessel 6.

This coolant is used to generate steam in a steam generator 10, the connection being made via the pipe line 11 which extends straight or linearly between the steam generator and the vessel 3.

This steam generator 10 has an enclosure 10a formed below a tube sheet 10b. A coolant pump 14, having an impeller 15, is mounted in the lower portion of the housing 10a, the impeller 15 being driven by an external rotary motor 16 having a drive shaft 16a which extends up through a suitable stuffing box in the bottom of the housing 10a, to the impeller 15. A suction connection 17 of the pump 14 draws coolant from an outlet manifold chamber 18 for the outlet leg of the heat exchanger 20. This heat exchanger is indicated only by broken lines but it is to be assumed to be of the usual type comprising an inverted U-shaped bundle of tubes having all of their leg ends mounted in the tube sheet 10b and with their outlet leg ends opening to the outlet manifold space 18.

The housing 10a is completely divided by a horizontal wall 19 forming upper and lower spaces, a portion of this wall 19 defining the bottom of the manifold chamber 18 with the opening to which the suction inlet 17 connects. A vertical partition 30 partitions off space above the horizontal wall 19 to form an inlet manifold chamber 21 for the inlet leg ends of the heat exchanger 20. The pump 14 discharges into the lower space 22 formed below the horizontal wall 19. The housing 10a is provided with a connection 10c in the form of a cylindrical stub into which the partition 19 extends, thus providing the housing 10a with a single connection divided by the partition 19 into an upper coolant inlet and a lower coolant outlet, and it is to this connection that the pipe 11 is connected.

Referring now particularly to FIG. 2, the pipe line 11 is shown in cross section with its upper conduit 24 through which the coolant is drawn from the vessel 3 by the pump 14 for passage through the heat exchanger 20, and the conduit 25 through which the coolant returns. The pipe itself is shown as having a cylindrical wall 26 with the transversely curved divider 27 having its side edges welded throughout their lengths to the inside of the pipe by welds 28 and 29. The partition wall 27 is shown with the curvature previously referred to and is generally horizontally arranged so that at one end it may be connected with the adjacent end portion of the horizontal wall 19. The conduits 24 and 25 should have substantially the same capacities.

With the transversely curved partition wall 27, the mating portion of the horizontal wall 19 may be correspondingly curved and then gradually merged to a flat wall. In FIG. 1 the partition 27 is shown as being flat, this being possible because of the elasticity of metal and the fact that the partition wall 27 is also thermally expanded and contracted with the pipe 26. The curvature shown by FIG. 2 has the advantage of reducing possible stress on the welded joints between the side edges of the partition wall 27 and the inside of the pipe 26.

As indicated by FIG. 1, the pressure vessel connection 30a may be made with a dividing wall 31 so that the upper conduit 24 connects with the inside of the core vessel 6 while the conduit 25 connects with the space between this vessel and the inside of the pressure vessel 3.

What is claimed is:

1. A pressurized-water reactor installation comprising a vertical reactor pressure vessel with an upper portion having at least one coolant connection with a horizontal dividing wall, said vessel internally having means for conducting coolant from below said wall downwardly into the vessel and then upwardly for discharge above the wall, a coolant pipe connected to and extending from the vessel's said connection and containing a horizontal partition wall extending throughout its length and connected with said dividing wall of the vessel's connection, a vertical steam generator positioned adjacent to said vessel, said generator having a lower portion having a coolant connection with which said pipe is connected and internally having a horizontal tube sheet above the generator's said connection and a horizontal partition below the tube sheet and horizontally aligned with and connected with the pipe's said horizontal partition wall and having a vertical partition wall extending upwardly to said tube sheet transversely with respect to the generator's said connection and forming horizontally separated spaces below the tube sheet and above the generator's horizontal partition, one of said spaces being adjacent to and connected to said pipe above its said horizontal partition wall, the generator's said horizontal partition forming a lower space therebelow, a vertical coolant pump vertically positioned in said lower space and discharging thereinto and having a suction inlet connected to the other of said spaces, said lower space being connected with said pipe below its said partition wall, and a vertical motor for driving said pump and positioned below and outside of the generator's said lower portion, a vertical shaft extending through said lower portion and interconnecting said motor and pump.

2. The installation of claim 1 in which the pipe's said horizontal partition wall is transversely curved in an upward direction.

* * * * *